(No Model.)
W. J. McGRAW.
SPRAYING APPARATUS.
No. 576,818. Patented Feb. 9, 1897.
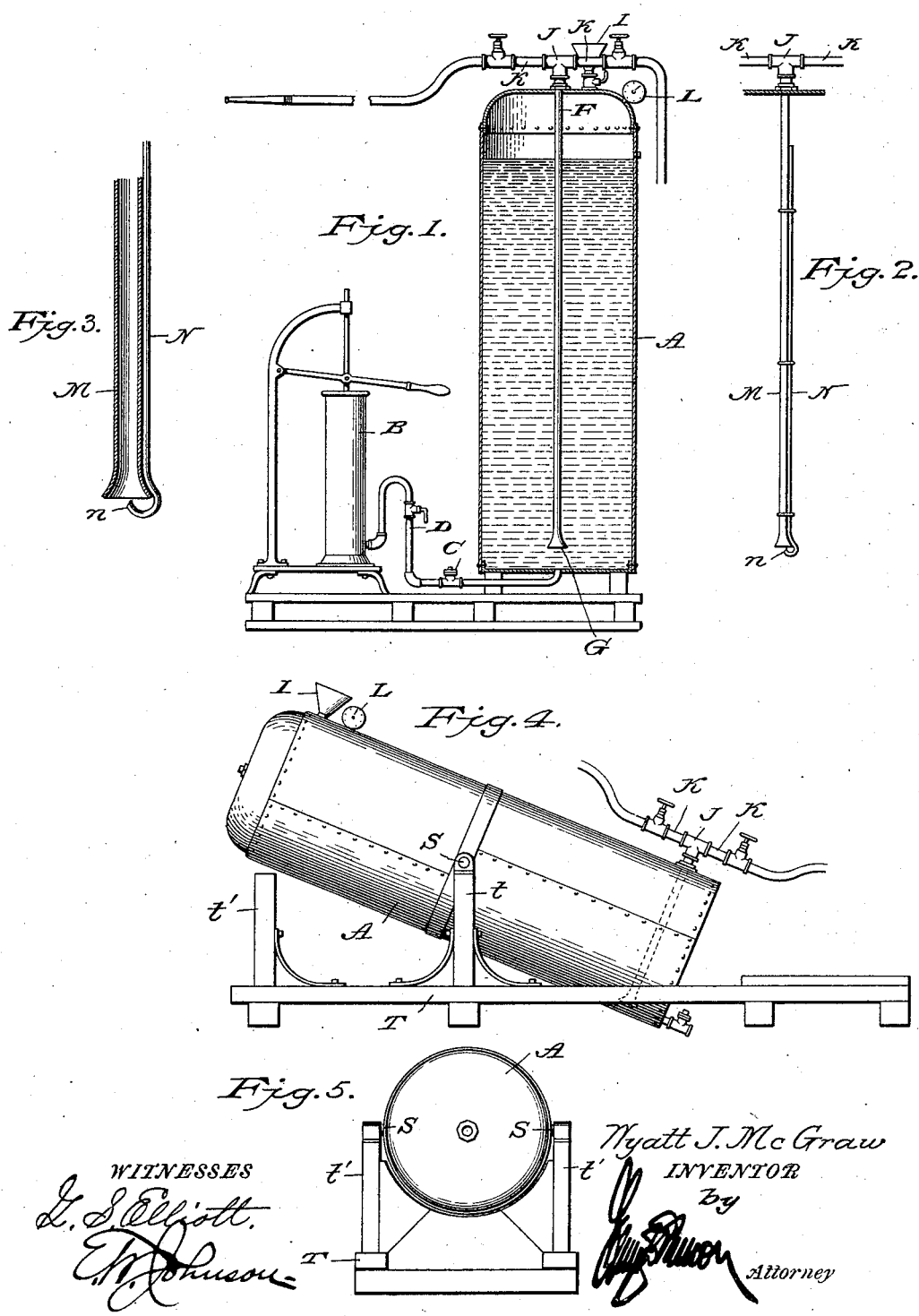

UNITED STATES PATENT OFFICE.

WYATT JOB McGRAW, OF WALLA WALLA, WASHINGTON.

SPRAYING APPARATUS.

SPECIFICATION forming part of Letters Patent No. 576,818, dated February 9, 1897.

Application filed September 23, 1895. Serial No. 563,448. (No model.)

*To all whom it may concern:*

Be it known that I, WYATT JOB McGRAW, a citizen of the United States of America, residing at Walla Walla, in the county of Walla Walla and State of Washington, have invented certain new and useful Improvements in Spraying Apparatus; and I do hereby declare the following to be a full, clear, and exact description of the invention, such as will enable others skilled in the art to which it appertains to make and use the same, reference being had to the accompanying drawings, and to the letters marked thereon, which form a part of this specification.

The object of this invention is to provide a spraying apparatus in which the cask or reservoir containing the liquid preparation is so mounted upon its supporting-frame that it can be readily transported and swung to a vertical position when desired for use, as well as oscillated to produce a thorough admixture of the ingredients of the liquid preparation. The apparatus embodies a pump for forcing air into the cask at the bottom thereof, so that said air will pass through the contents of said cask to agitate the liquid, a tube for taking the liquid from the bottom of the cask or reservoir and conveying it to the discharge pipes or hose, and a supplemental tube for using dry powders in connection with the device.

With the above ends in view the invention consists in the particular construction and combination of the parts, all as will be hereinafter fully set forth, and specifically pointed out in the claim.

In the accompanying drawings, forming part of this specification, Figure 1 is a vertical sectional view of an apparatus constructed in accordance with my invention. Fig. 2 is a detail view of the supplemental tube used in spraying dry powders. Fig. 3 is a detail sectional view of the lower end of said supplemental tube. Fig. 4 is a side elevation showing a modification of my invention, including the preferred manner of supporting the cask or reservoir. Fig. 5 is an end view of Fig. 4, the cask or reservoir being in position for transportation.

A designates the cask or reservoir, which, as shown in Fig. 1, is supported in an upright position upon a base frame or platform, said platform also supporting an air-pump B, of ordinary construction. The air-pump is connected to the cask or reservoir A by means of a pipe D, which is let into the bottom of said cask at the central portion thereof, and is provided with a check-valve C.

Centrally within the cask A depends a tube F, the lower open end G of which is positioned a short distance above the bottom of said cask and on a line with the inlet-opening of the pipe D, which extends from the air-pump. The upper end of the tube F connects with a T-coupling J, to which are also connected short pipes K K, to which the distributing pipes or hose are attached, said short pipes K having cocks or cut-offs of ordinary construction, and the hose are provided at their outer ends with the usual spraying-nozzles. The reservoir or cask is also provided with a filling-tube I, having a cock, and with an indicator L for determining the amount of air-pressure in said reservoir or cask.

The tube shown in Fig. 2 is intended for the purpose of adapting the device for use in spraying dry powder upon trees or plants, and this tube consists of two sections or tubes M and N, which are connected to each other in any suitable manner, the tube N extending below the tube M and is curved upward to locate the outlet $n$ thereof at the center of the lower open end of the tube M, said outlet $n$ being beveled, as shown, and for the purpose hereinafter set forth. The tube N is filled with dry powder through the filling-tube I, and this operation can be facilitated by removing said filling-tube to provide a larger opening. When the tube N is filled, the powder will collect in the curved lower end thereof, and as the air from the pump B is forced directly into the tube M from the pipe D the rush of air passing by the outlet $n$ will carry a certain amount of the powder with it, the beveled end of said outlet facilitating this action.

In using the tube F the liquid will be forced through said tube into the hose by the pressure of air in the space at the upper end of the reservoir or cask, and by working the air-pump during the spraying operation the air which passes from the pipe D will enter the tube F and mix a certain quantity of air with the liquid to produce a finer spray. By letting the pipe D into the bottom of the reservoir this arrangement also provides for the thorough admixture of the ingredients of the liquid preparation.

In Fig. 4 I have shown a modification of the liquid-spraying apparatus, which consists in providing the reservoir with trunnions S, journaled in uprights $t$ of the supporting-frame T, said frame being provided with additional uprights $t'$, and between the uprights $t$ and $t'$ are secured boards, forming beds for the reservoir to rest upon. This modification also shows a different arrangement or positioning of the depending tube F and air-supply pipe D to accommodate the position of the reservoir when in use, but it will be noted that the pipe D discharges the air toward or against the lower open end of the tube F, for the purpose hereinbefore stated.

Having thus described my invention, what I claim as new, and desire to secure by Letters Patent, is—

In a spraying apparatus, the combination with the cask or reservoir, and air-pump; of a pipe leading from the air-pump and opening into the bottom of the cask or reservoir, and two parallel tubes M and N for spraying dry powder vertically disposed in the cask or reservoir, the lower end of one of said tubes being extended and curved to locate the outlet thereof at the center of the lower open end of the other tube, the air-supply pipe discharging into the lower end of the straight tube, substantially as shown and for the purpose set forth.

WYATT JOB McGRAW.

Witnesses:
CHAS. E. SEARS,
FRED A. COLT.